United States Patent
Kunz

(10) Patent No.: US 7,158,252 B2
(45) Date of Patent: Jan. 2, 2007

(54) REAL-TIME DISTRIBUTION OF IMAGING METRICS INFORMATION

(75) Inventor: Robert J Kunz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 870 days.

(21) Appl. No.: 10/087,405

(22) Filed: Feb. 26, 2002

(65) Prior Publication Data

US 2003/0160996 A1 Aug. 28, 2003

(51) Int. Cl.
*G06F 3/12* (2006.01)
(52) U.S. Cl. .......................... 358/1.15; 705/1
(58) Field of Classification Search .............. 399/27, 399/24, 8; 347/19, 7; 358/1.15
See application file for complete search history.

(56) References Cited

U.S. PATENT DOCUMENTS

| | | | |
|---|---|---|---|
| 5,802,420 A * | 9/1998 | Garr et al. ................... | 399/27 |
| 5,937,225 A * | 8/1999 | Samuels ...................... | 399/27 |
| 6,356,359 B1 * | 3/2002 | Motamed .................... | 358/1.8 |
| 6,672,695 B1 * | 1/2004 | Naka et al. .................. | 347/7 |
| 6,762,854 B1 * | 7/2004 | Murakami et al. .......... | 358/1.16 |
| 6,798,997 B1 * | 9/2004 | Hayward et al. ............ | 399/12 |
| 2002/0059106 A1 * | 5/2002 | Tani ............................ | 705/26 |
| 2002/0172520 A1 * | 11/2002 | Suyehira ..................... | 399/24 |
| 2003/0135381 A1 * | 7/2003 | Mathiesen et al. .......... | 705/1 |
| 2004/0204986 A1 * | 10/2004 | Shimbori et al. ............ | 705/14 |

OTHER PUBLICATIONS

Polling Mode: Interrupts Versus Polling, http://www.mathworks.com/access/helpdesk/help/toolbox/xpc/ch_interpt_poll4.html.*
What is polling?, http://www.webopedia.com/TERM/p/polling.html.*
What is interrupt?, http://www.webopedia.com/TERM/i/interrupt.html.*
Harold S. Stone, Microcomputer Interfacing, Feb. 1983, pp. 21-23.*

* cited by examiner

*Primary Examiner*—Mark Zimmerman
*Assistant Examiner*—Vincent M. Rudolph

(57) ABSTRACT

In a distributed computing environment, the following arrangements and procedures provide an imaging device and an imaging metric information server to distribute the imaging device's operational metrics (e.g., print media and toner utilization information) The metrics information are accessible by applications at any time from the server in real-time, independent of forwarding any request for the imaging metrics to the imaging device. Because imaging operational metrics are accessed by an application through the server, the imaging device does not use valuable resources such as bandwidth and processing power to respond to metrics information requests received from the application.

28 Claims, 4 Drawing Sheets

REAL-TIME DISTRIBUTION OF IMAGING METRICS INFORMATION

TECHNICAL FIELD

The described subject matter relates to imaging devices. In particular the subject matter pertains to providing real-time access to imaging device operation metrics data.

BACKGROUND

Networked imaging devices typically manage their own metric information such as the amounts and types of print media that have been used, or imaged upon. For example, each time that a printer forms an image onto a sheet of print media, the printer typically stores this information into a memory. This information can be quite valuable to ongoing business objectives.

For example, imaging device metric information can be used by a billing utility to determine appropriate client billing by identifying the types and amount of print media used to complete an imaging job for the client. In another example, such metric information can be used by an order-processing utility to re-order consumables such as print media, toner, and so on.

To provide imaging device metric information to other applications, a networked imaging device generally exposes an interface (e.g., through a device driver) to allow various applications to request imaging metrics from the device. Responsive to receiving such a request, the imaging device accesses the stored metric information from memory and subsequently uploads it to the requesting application.

Responding to such a metric information request from an application requires the imaging device to dedicate valuable resources such as data bandwidth and processing cycles to return the information to the requesting application. This is data bandwidth and processing power that otherwise could have been used to respond to an actual imaging operation such as a print job. In other words, if a user submits a print job to the imaging device while the device is responding to an imaging metrics request (e.g., accessing and uploading imaging metrics), the user may have to wait a substantial amount of time before the device processes the print job.

To avoid potential congestion at the imaging device while obtaining imaging metrics, administrators typically only download an imaging device's operation metrics on a scheduled periodic basis after normal business hours have closed (e.g., weekly, monthly, etc.) in a batch job. Users of the imaging device can in turn schedule their imaging jobs so that they do not coincide with these scheduled download times.

Ongoing business functions, however, may be timelier or more efficiently performed if imaging device metric information could be obtained from the device in a timelier manner, rather than after business hours once a week, once a month, or the like. Additionally, by the time that metric information is retrieved from the device, it may be stale. This means that the retrieved information's business value may be substantially reduced as compared to what its value may have been had the information been downloaded from the imaging device in a more timely manner.

Ideally, administrators could query for such imaging device metric information at any time, regardless of whether the imaging device may be responding to other requests (e.g., print job requests), and without causing inconvenient congestion problems at the imaging device. The following described subject matter addresses these and other problems of obtaining metric information from an imaging device.

SUMMARY

In a distributed computing environment, the described subject matter provides an imaging device to distribute operational metrics to an imaging metrics server. Other devices can access the metrics information from the server in real-time, independent of forwarding any request to the imaging device. Specifically, responsive to performing an imaging operation, the imaging device communicates an unsolicited set of operational metrics corresponding to the imaging operation to the imaging metrics server. The metrics server receives the unsolicited imaging operational metrics. The metrics server receives a request from an application program for at least a portion of the received imaging operational metrics. Responsive to the request, the metrics server communicates at least the portion of the imaging operational metrics to the requesting application.

BRIEF DESCRIPTION OF THE DRAWINGS

The same numbers are used throughout the drawings to reference like features and components.

DETAILED DESCRIPTION

Overview

The described arrangements and procedures provide an imaging device that updates image operation metric information (e.g., print media usage counts, toner usage data, and so on) to a database that is managed by an imaging device metrics information server. When an application (e.g., a billing utility, an order processing utility, etc.) desires image device metric information, the application queries and downloads the required information from the imaging device metrics server, rather than directly from the imaging device.

The application may also register with the server to automatically receive imaging device operational metrics from the server whenever those metrics information are updated (e.g., uploaded from the imaging device to the server for the first time or periodically updated responsive to image device operations). For instance, instead of polling or querying the server for imaging device operational metrics, the server can dynamically communicate any received imaging device operational metrics to the application in response to metric information having been communicated to the server by an imaging device.

Because imaging device operational metrics information is accessed by an application through a server, the imaging device does not use valuable resources such as bandwidth and processing power to respond to metrics information requests received from the application. This allows for the imaging device's operational metrics to be accessed at any time, even during peak hours of imaging device usage, without causing inconvenient and possibly expensive congestion problems at the imaging device.

Moreover, since imaging device metrics information can be accessed at any time in a manner that does not disrupt printing operations; the metrics information can also be downloaded and processed at times wherein the data can be afforded its most significant business value.

Exemplary System

Figure 1:
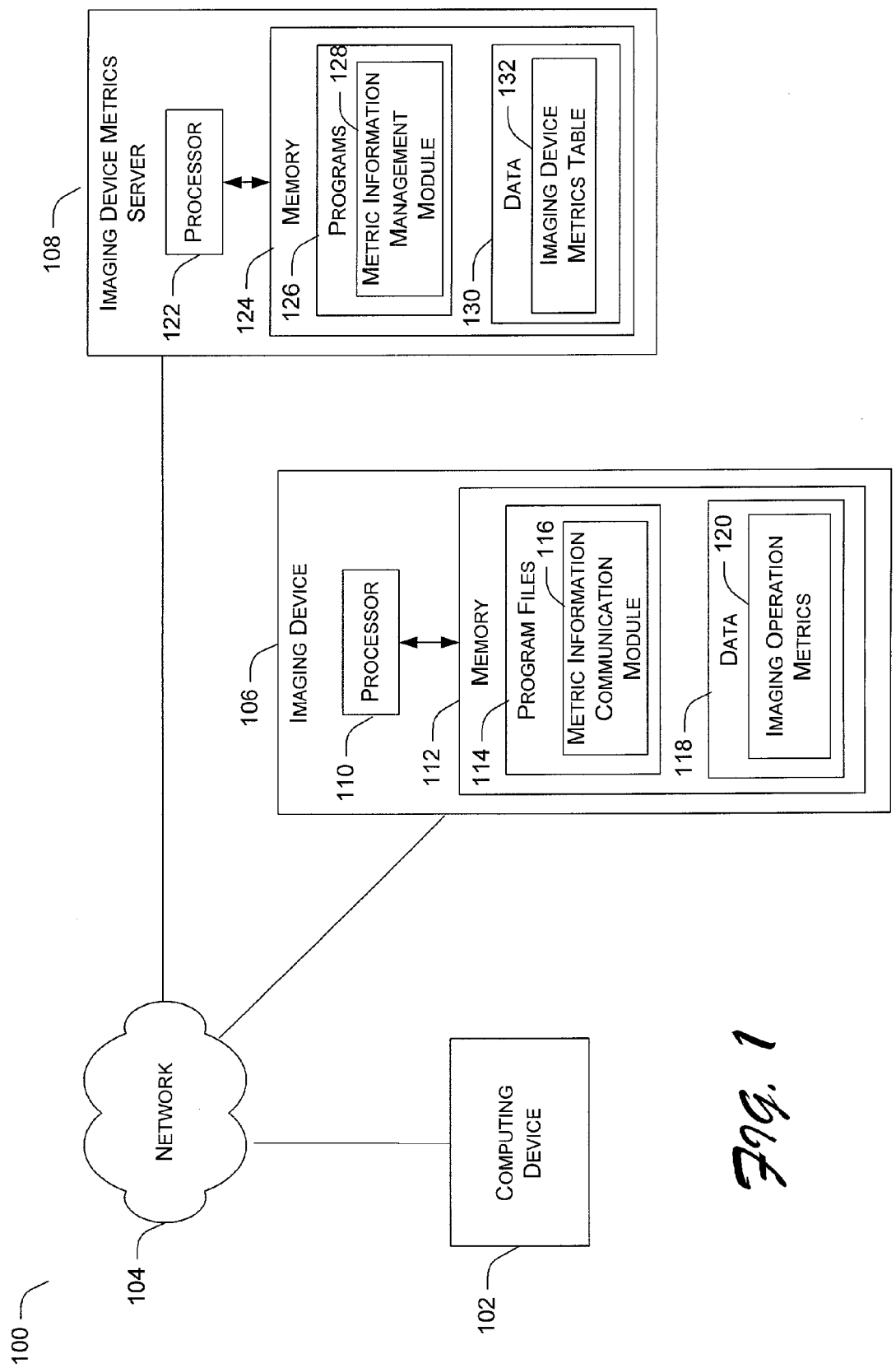
FIG. 1 is a block diagram that shows an exemplary system to provide substantially real-time access to an imaging device's metric information without causing congestion problems at the imaging device.

FIG. 1 is a block diagram that shows an exemplary system 100 to provide substantially real-time access to an imaging device's metric information without causing congestion problems at the imaging device. Specifically, a computing device 102 is operatively coupled across a communication medium 104 both to an imaging device 106 and to an imaging device metrics information server 108. Other system arrangements are possible including additional host devices, additional imaging forming devices, and/or additional metric information servers coupled to the communication medium.

The computing device 102 is implemented as a personal computer (PC), server, Web Server, or other device configured to communicate with the image forming device 106 and the server 108. The communication medium 104 is a parallel connection, a packet switched network (e.g., an organizational intranet network), the Internet, and/or other communication configurations that provide electronic exchange of information between the computing device 102, the image forming device 106, and the server 108 using an appropriate protocol (e.g., TCP/IP, UDP, SOAP, and so on).

The imaging device 106 includes a processor 110 that is coupled to a system memory 112. The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

The processor 110 is configured to fetch and execute computer program instructions from application programs 114 such as the metric information communication module 116, an operating system (not shown), etc. The processor also stores and fetches data 118 such as imaging device metrics data 120 while executing the application programs.

The image forming device 106 is configured to form images upon print media (e.g., paper, envelopes, transparencies, labels, etc.). One exemplary image-forming device is a printer, such as a laser printer, an inkjet printer, a dot matrix printer, a dry medium printer, or a plotter. The described arrangements and procedures are embodied within other image forming device configurations such as multiple function peripheral devices, copiers, facsimile machines, plotters, and so on. The imaging device includes one or more print media supplies into which various print media can be loaded (e.g., print media bins for distributing sheets of a ream of print media or for distributing lengths of print media from a roll of media).

The metric information communication module 116 communicates real-time imaging operation metrics information 120 such as a substantially unique imaging device ID, a page count indication, the types and amounts of print media used, toner use information (e.g., the approximate amount of toner remaining in the imaging device), and so on, to the server 108 for subsequent storage and communication to one or more computing devices 102 in response to requests for imaging metrics information.

For example, responsive to the imaging device performing an imaging operation (e.g., forming an image on a sheet of print media), the metrics information communication module 116 substantially immediately (e.g., in real-time) communicates metric information corresponding to the imaging operation to the metrics server. Metric information includes, for example, media usage information by media type (e.g., page count data), toner use information such as the amount of toner utilized in a particular or previous print job, etc. This information is collected by an imaging device 106 in any of a number of different manners.

The imaging device metrics information server 108 includes a processor 122 coupled to a system memory 124. The system memory includes any combination of volatile and non-volatile computer-readable media for reading and writing. The processor is configured to fetch and execute computer program instructions from application programs 126 such as the metric information management module 128, an operating system (not shown), and so on. The processor also stores and fetches data such as imaging device metrics table 132 to/from data 130 while executing the application programs.

The metric information management module 128 receives metric information (e.g., metrics 120) from one or more various imaging devices 106. Responsive to receiving this data, the server stores the data into the imaging device metrics table 132. (An exemplary imaging device metrics table 132 is described in greater detail below in reference to FIG. 2). Responsive to receiving requests from one or more computing devices 102, the server accesses and communicates metrics information from the table 132 to the requesting computing device(s).

For example, a billing utility application executing on the device 102 registers or communicates a request for metrics information that corresponds to a particular imaging device 106. Since the imaging device has communicated its imaging operation metric information 120 to the server 108 for storage, the server can communicate the information corresponding to the particular imaging device back to the requesting device 102. Advantageously, since the billing utility does not query the particular imaging device for this information, the request will not cause potentially problematic congestion problems at the particular imaging device.

Moreover, since requesting an imaging device's operational metrics does not disrupt printing operations at the imaging device 106, the device's operational metrics 120, which are now stored in the imaging device metrics table 132 on server device 108, can be accessed at any time and accessed as many times as desired such that the data can be affording its most substantial business value.

Computer-Readable Media

The subject matter is illustrated in FIG. 1 as being implemented in a suitable computing environment. Although not required, the subject matter is described in the general context of computer-executable instructions, such as program modules 116 and 128 that are respectively executed by the imaging device 106 or the server device 108.

Program modules typically include routines, programs, objects, components, data structures, and so on, that perform particular tasks or implement particular abstract data types. Moreover, those skilled in the art will appreciate that the described arrangements and procedures may be practiced with other computer system configurations, including multi-processor systems, microprocessor-based or programmable consumer electronics, network PCs, minicomputers, mainframe computers, etc.

The arrangements and procedures may also be practiced in distributed computing environments where tasks are performed by remote processing devices that are linked through a communications network. In a distributed computing environment, program modules may be located in both local and remote memory storage devices (computer-readable media).

An Exemplary Imaging Device Metrics Information Data Structure

Figure 2:
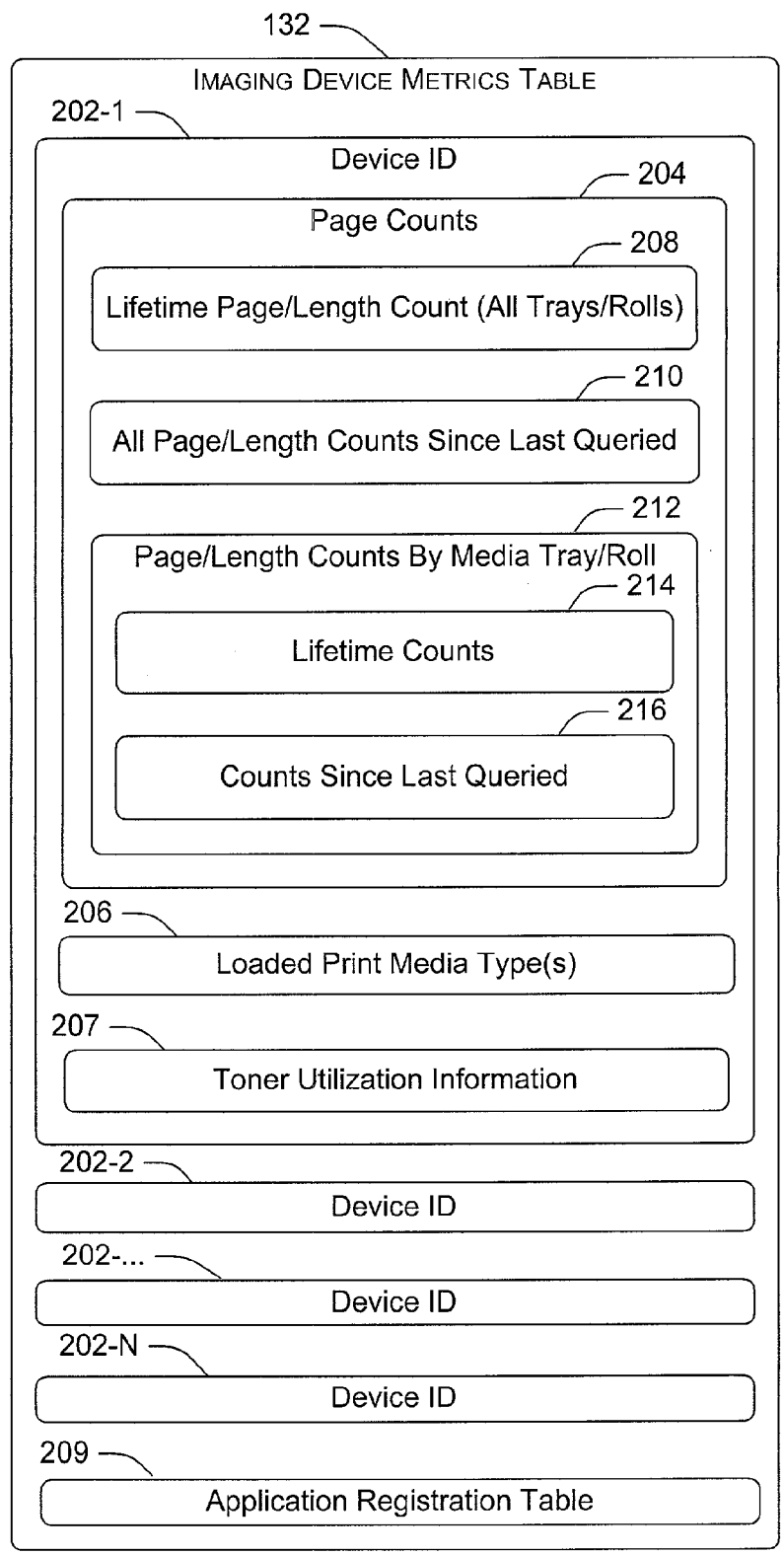
FIG. 2 shows an exemplary imaging device metrics information data structure that is managed by an imaging device metrics information server to provide substantially real-time access to imaging metrics.

FIG. 2 shows an exemplary imaging device metrics information data structure 132 that is managed by a server (e.g., server 108 of FIG. 1). At least a portion of this information is communicated to the server by one or more various imaging devices 106 of FIG. 1. The metrics information data structure includes a number of device ID data fields 202 and an optional application registration table 209.

Each device ID data field 202 is a substantially unique identifier of a respective imaging device 106 of FIG. 1. Such unique identifiers include, for example, an Internet Protocol (IP) address, a network translation address, an alias, and so on. Metric information for any number of imaging devices can be managed by the server. Thus, there can be any number of device data fields 202 in the data structure 132 (e.g., device ID data fields 202-1 through 202-N).

Each device ID data field 202 includes a set of other information such as page count 204 print media type 206, and toner utilization information 207 corresponding to the particular imaging device 106 identified by the device ID 202. For instance, the page count information 204 may include: (a) a lifetime page/length count to identify the total number of pages/length of print media that has been used by the device since it was put into operation; (b) page/length counts 210 since metric information for the imaging device (e.g., a device identified by the device id 204) was last downloaded by a particular computing device (e.g., device 102 of FIG. 1); and (c) page/length counts by media supply 212 (e.g., tray or roll dispenser) such as lifetime counts and counts since last queried 216.

In yet another example, metric information includes toner use information 207 (e.g., an amount of toner utilized in a particular or previous print job, etc). This information is collected by an imaging device 106 of FIG. 1 in any of a number of different manners. For instance, a total amount of toner in a toner cartridge is determinable at cartridge manufacture time. An amount of toner used by an image forming device 106 to form a single dot on print media of various types is determined. This amount of toner utilized in an imaging job is a function of dot size, dot density, desired imaging quality (e.g., draft or fine printing), and the like.

As image forming dots are placed on print media (e.g., a sheet or portion of a roll), the imaging device determines the amount of toner used (e.g., grams of toner) to form the image based on the number of dots imprinted on the media. This information is communicated to the metrics server 108 for subsequent distribution to interested computer program applications (e.g., to determine remaining toner cartridge imaging capabilities).

Optional application registration table 209 includes information to indicate that a requesting application desires to automatically receive image operational metrics corresponding to one or more imaging devices 106 of FIG. 1. The table 209 includes, for example, an application ID and an indication of which of the imaging devices identified by the image device IDs 202 for which the registering application would like to automatically receive imaging operational metrics. The application ID can any type of application ID such as a memory address, an IP address, an intranet address, and so on.

Other data structure 132 arrangements are possible including different or additional data fields. An imaging device 106 can communicate any kind of metrics information 132 to the metrics server 108 for storage and subsequent communication to one or more other computing devices 102. The types and sophistication of the metrics information used in any one implementation is based on the function of the imaging device 106 and the needs of one or more applications that utilize the imaging device's metrics information 132. Accordingly, application developers can tailor not only the types of information communicated by an imaging device 106 to the server 108, but can also tailor the server's interface, management, and storage of the communicated information in the metrics table 132 to mirror application specific requirements.

Exemplary Procedure

Figure 3:
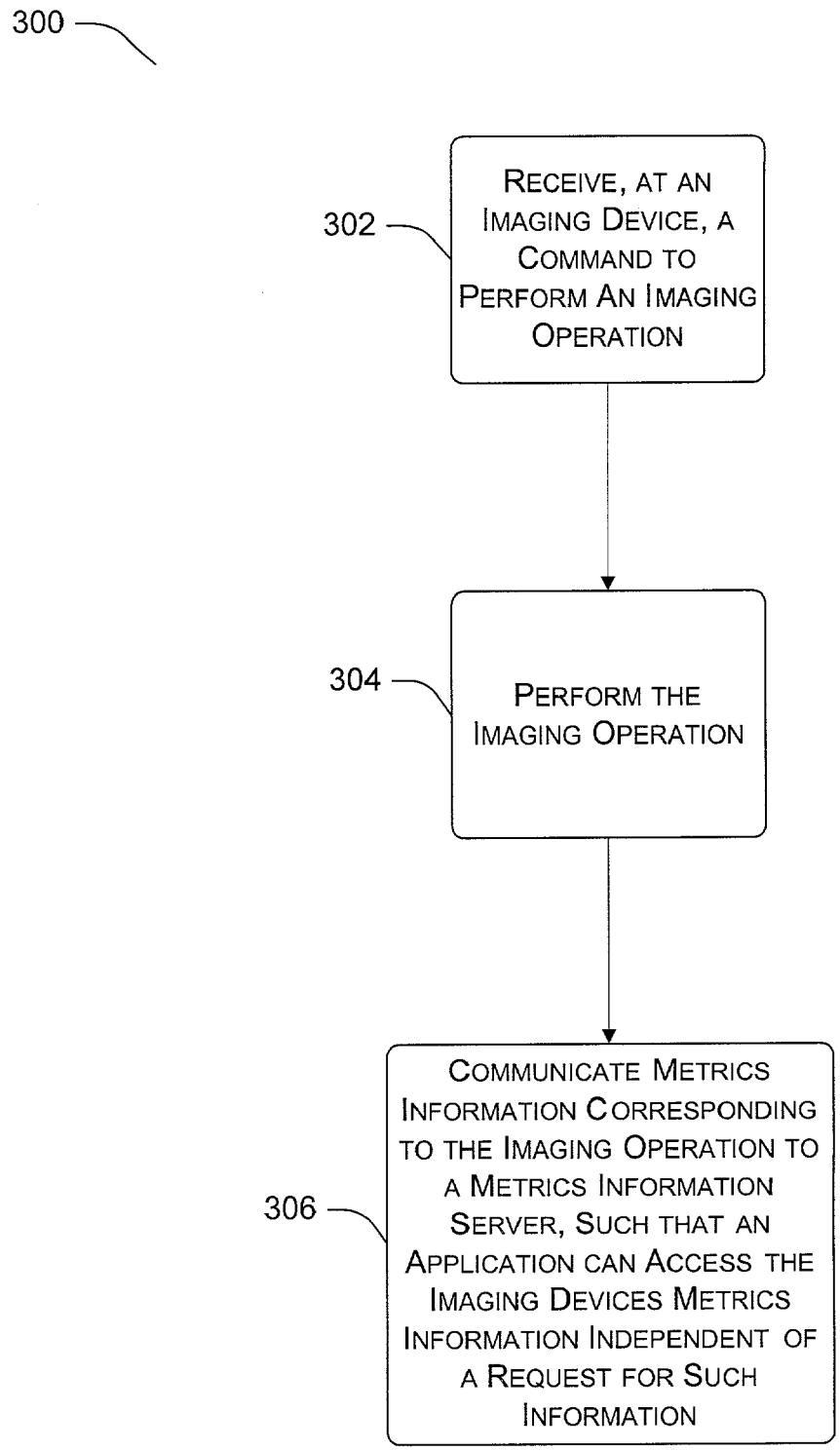
FIG. 3 is shows an exemplary procedure for an imaging device to provide substantially real-time access to imaging device metric information in a manner that is independent of sending a request for such information to the imaging device.

FIG. 3 is shows an exemplary procedure 300 for an imaging device to provide substantially real-time access to an imaging device's operational metrics (e.g., media amount (s) and type(s), toner utilization, etc.). At block 302, the imaging device 106 of FIG. 1 receives a command from a device 102 of FIG. 1 to perform a requested imaging operation (e.g., to form an image on a portion (e.g., a sheet or roll) of print media). At block 304, the imaging device performs the requested imaging operation. At block 306, the imaging device communicates metrics information corresponding to the performed imaging operation (block 304) to a metrics information server 108 of FIG. 1. In this manner, the imaging device provides real-time updates of its operational metrics to the metrics server that distributes the device's operational imaging metrics upon request.

Figure 4:
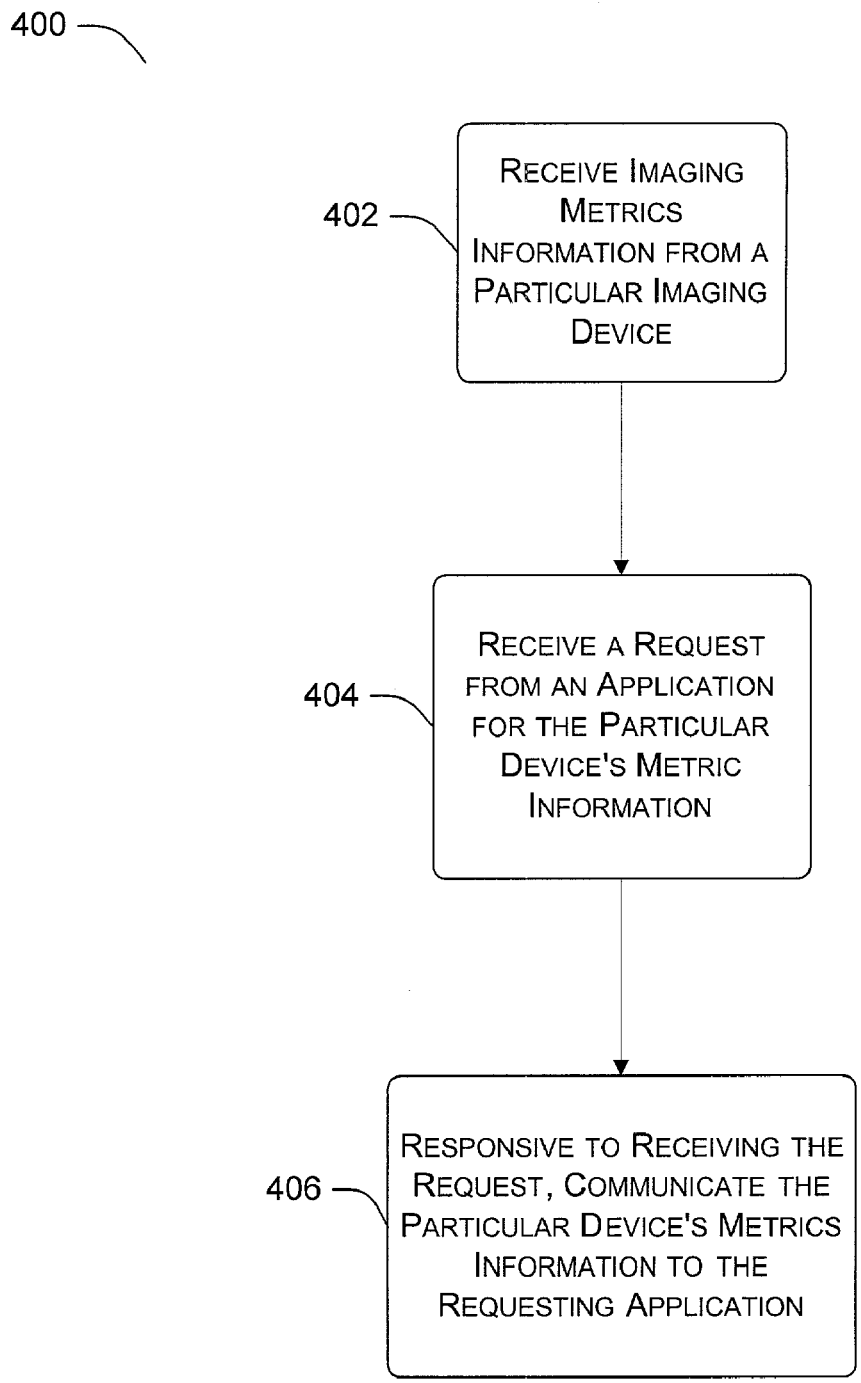
FIG. 4 is shows an exemplary procedure for a metrics information server to provide application access to real-time imaging device metric without causing any corresponding congestion at the imaging device.

FIG. 4 is shows an exemplary procedure 400 for a metrics information server 108 of FIG. 1 to provide substantially real-time access to an imaging device's (e.g., device 106 of FIG. 1) metric information in a manner that is independent of sending a request for such information to the imaging device. At block 402, the server receives unsolicited imaging device metrics information from the imaging device. At block 404, the server receives a request for the received metric information (block 402) from a computer program application executing on computer 102 of FIG. 1. At block 406, the server communicates the requested metric information to the requesting computer program application.

In this manner, the metrics server 108 provides imaging device operational metrics to requesting devices 102 at any time without requiring an imaging device devote finite bandwidth and processing resources to process such a request.

CONCLUSION

Although the subject matter has been described in language specific to structural features and/or methodological operations, it is understood that the arrangements and procedures defined in the appended claims is not necessarily limited to the specific features or operations described. Rather, the specific features and operations are disclosed as preferred forms of implementing the claimed subject matter.

The invention claim is:

1. In a distributed computing environment, a method for distributing peripheral device operational metrics information, the method comprising:
   receiving, by an imaging device, a command to perform an imaging operation;
   responsive to receiving the command, performing, by the imaging device, the imaging operation; and
   responsive to performing the imaging operation, communicating, by the imaging device, metrics information corresponding to the imaging operation directly to a second device without communicating the metrics information through any intermediate device;
   receiving, at the second device, a request from a third device to access the metrics information; and
   responsive to receiving the request, providing access to the metrics information to the third device without the third device communicating with the imaging device.

2. A method as recited in claim 1, wherein the metrics information comprises page count and print media type information.

3. A method as recited in claim 1, wherein the metrics information is not directly solicited from the imaging device by the second or third device.

4. A method as recited in claim 1, wherein the metrics information comprises toner utilization information.

5. A method as recited in claim 1, wherein the request from the third device to access the metrics information is a registration request to automatically receive the metrics information whenever the metrics information is updated, and wherein the providing access to the metrics information to the third device includes the second device communicating the metrics information to the third device when the imaging device communicates updated metrics information to the second device.

6. A method as recited in claim 1, wherein the application on the third device can access the metrics information multiple times, and wherein the metrics information includes data indicative of only the imaging operations performed by the imaging device since the last access by the application on the third device.

7. A method as recited in claim 6, wherein the metrics information includes a page/length count for the imaging device since the last access by the application on the third device.

8. A method as recited in claim 6, wherein the metrics information includes a plurality of page/length counts, each for a corresponding individual one of a plurality of individual media supplies in the imaging device, since the last access by the application on the third device.

9. A method as recited in claim 1, wherein a plurality of applications on the third device can each access the metrics information multiple times, and wherein the metrics information provided to each individual one of the applications includes data indicative of only the imaging operations performed by the imaging device since the last access by the corresponding individual one of the applications on the third device.

10. A method as recited in claim 1, wherein a plurality of applications each on a corresponding one of a plurality of third devices can each access the metrics information multiple times, and wherein the metrics information provided to each individual one of the applications includes data indicative of only the imaging operations performed by the imaging device since the last access by the corresponding individual one of the applications on the corresponding one of the plurality of third devices.

11. A method as recited in claim 1, wherein the communicating the metrics information is performed substantially immediately after performing the imaging operation.

12. A method as recited in claim 1, wherein the imaging operation comprises a plurality of imaging operations, and wherein the communicating the metrics information is performed substantially immediately after performing each of the imaging operations.

13. In a distributed computing environment, a computer-readable medium comprising computer-executable instructions for distributing peripheral device metrics information, the computer-executable instructions comprising instructions for:
   receiving, by an imaging device, a command to perform an imaging operation;
   performing, by the imaging device, the imaging operation; and
   responsive to performing the imaging operation, communicating, by the imaging device, metrics information corresponding to the imaging operation directly to a second device without communicating through any intermediate device, the metrics information for access by an application on a third device, such that the application on the third device can access the metrics information without forwarding any request for the metrics information to the imaging device.

14. A computer-readable medium as recited in claim 13, wherein the metrics information comprises page count and print media type information.

15. A computer-readable medium as recited in claim 13, wherein the metrics information is not directly solicited from the imaging device by the second or third device.

16. A computer-readable medium as recited in claim 13, wherein the metrics information comprises toner utilization information.

17. A computer-readable medium as recited in claim 13, wherein the application is at least one of a billing utility or an order processing utility.

18. An imaging device comprising:
   a memory comprising computer-executable instructions for distributing metrics information corresponding to imaging operations;
   a processor that is operatively coupled to the memory, the processor being configured to fetch and execute the computer-executable instructions from the memory, the computer-executable instructions comprising instructions for:
   receiving, by the imaging device, a command to perform an imaging operation;
   performing, by the imaging device, the imaging operation; and
   responsive to performing the imaging operation, communicating, by the imaging device, metrics information corresponding to the imaging operation directly to a second device without communicating through any intermediate device, the metrics information for access by an application on a third device, such that the application on the third device can access the metrics information without forwarding any request for the metrics information to the imaging device.

19. An imaging device as recited in claim 18, wherein the metrics information comprises page count and print media type information.

20. An imaging device as recited in claim 18, wherein the metrics information is not directly solicited from the imaging device by the second or third device.

21. An imaging device as recited in claim 18, wherein the metrics information comprises toner utilization information.

22. In a distributed computing environment, a computer-readable medium comprising computer-executable instructions for providing real-time imaging metrics information, the computer-executable instructions comprising instructions for:
- receiving, at a server device, imaging operational metrics corresponding to an imaging operation directly from an imaging device, the imaging operation having been performed by the imaging device;
- receiving, at the server device, a request from an application program for at least a portion of the imaging operational metrics, the application program executing on another device different from the imaging device and the server device; and
- communicating the at least a portion of the imaging operational metrics from the server device to the application program.

23. A computer-readable medium as recited in claim 22, wherein the metrics information comprises page count and/or print media type information.

24. A computer-readable medium as recited in claim 22, wherein the metrics information comprises toner utilization information.

25. A computer-readable medium as recited in claim 22, wherein the communicating is performed automatically without the application program polling or querying the server device.

26. A server comprising:
- a memory comprising computer-executable instructions for providing real-time imaging metrics information;
- a processor that is operatively coupled to the memory, the processor being configured to fetch and execute the computer-executable instructions from the memory, the computer-executable instructions comprising instructions for:
  - receiving, at the server, an unsolicited set of imaging operational metrics corresponding to an imaging operation directly from an imaging device, the imaging operation having been performed by the imaging device;
  - receiving, at the server, a request from an application program for at least a portion of the imaging operational metrics, the application program executing on another device different from the imaging device and the server; and
  - communicating the at least a portion of the imaging operational metrics to the application program.

27. A server as recited in claim 26, wherein the request from the application program is a registration request for the server to provide the at least a portion of the imaging operational metrics to the application program when the at least a portion of the imaging operational metrics are updated responsive to the imaging device performing imaging operations, and wherein the communicating is performed automatically without the application program polling or querying the server device.

28. In a distributed computing environment, a method for providing real-time imaging metrics information, the method comprising:
- receiving, at a server device, imaging metrics corresponding to an imaging operation directly from an imaging device, the imaging operation having been performed by the imaging device;
- receiving, at the server device, a registration request from an application program for the server to provide the imaging metrics to the application program when the imaging metrics are updated responsive to the imaging device performing the imaging operation;
- responsive to the registration request, configuring the server device to automatically communicate the at least a portion of the imaging metrics to the application program; and
- responsive to receiving the imaging metrics, automatically communicating at least a portion of the imaging metrics to the application program.

* * * * *